United States Patent
Buck

[15] 3,659,490
[45] May 2, 1972

[54] FASTENING DEVICE

[72] Inventor: Harold G. Buck, 2302 Dawes St., Ashland, Nebr. 68003

[22] Filed: Aug. 27, 1969

[21] Appl. No.: 853,391

[52] U.S. Cl. .............................................. 85/1 R, 287/104
[51] Int. Cl. ..................................................... F16b 35/00
[58] Field of Search ........................ 85/42, 1, 1 S, 33, 51, 14, 85/50, 50 AT, 79, 9; 287/128, 127, 103, 189.36 F, 189.36 D, 104, 64–65; 151/34, 35, 15; 52/713, 71 A

[56] References Cited

UNITED STATES PATENTS

| 877,061 | 1/1908 | Earnest.................................85/1 |
| 953,298 | 3/1910 | Schmidt...............................85/1 S |
| 1,749,547 | 3/1930 | Ruddy..................................85/1 X |
| 2,504,018 | 4/1950 | Gibson et al. ....................85/33 UX |
| 163,558 | 5/1875 | Weeks et al. ......................287/104 |
| 650,412 | 5/1900 | McLellan........................287/104 X |
| 867,312 | 10/1907 | Shutz..................................287/104 |

FOREIGN PATENTS OR APPLICATIONS

| 255,354 | 10/1959 | Australia ...............................85/33 |
| 286,570 | 6/1931 | Italy......................................85/33 |

Primary Examiner—Ramon S. Britts
Attorney—Henderson & Strom

[57] ABSTRACT

A fastening device for detachably securing two members together, the device comprising a pair of mateable sections, each section being secured to one or the other of the members, and a pin disposed in aligned bores formed in the sections to maintain the sections in the mated position. The sections having mateable faces which coact in a manner wherein when in a locked position they cannot be separated except by moving one of them away from the other in a plane normal to the plane in which the stresses or impacts under use occur, and the pin removably mounted in the aligned bore to prevent movement of one section relative to the other section.

4 Claims, 6 Drawing Figures

Patented May 2, 1972

3,659,490

INVENTOR.
HAROLD G. BUCK
BY
Henderson & Strom
ATTORNEYS

FASTENING DEVICE

BACKGROUND OF THE INVENTION

This invention pertains generally to a fastening device, and more particularly to a device for detachably securing the members of a concrete form or the like together.

In the construction field, and particularly in concrete construction forms and the like, form members are usually temporarily secured together by nails, bolts, pins, wedges and the like. These fastening devices are not always satisfactory in that they do not securely hold the members together, are extremely difficult to assemble or disassemble, and in many instances work loose if the form is subjected to vibration.

Concrete forms must withstand rough usage, especially the impacts and stresses involved in pouring concrete, and at the same time provide structural relationships in construction that will permit the form to be assembled and disassembled with ease and dispatch. Many assemblages have been provided utilizing various complicated holding or locking devices, but they generally involve a number of linkages, arms and the like, all of which occasionally become disaligned or broken and thus ineffective in use.

To be effective, a holding or locking device must be simple in construction and extremely effective in use. Bolts that are threaded onto threaded shafts require wrenches and the like to assemble and disassemble, nails are easily jarred loose or provide insufficient holding characteristics, pins or the receiving slots for the pins can be sheered and threaded devices become inoperable when the threads are marred or destroyed.

SUMMARY OF THE INVENTION

In brief, this invention relates to a fastening device for detachably securing or locking at least two members together. The device comprises a pair of plates, each attached to one or the other of the members, having mateable faces which when mated and pinned or keyed together cannot be pulled or forced apart. Each face has at least three surfaces, two of which are parallelly aligned and the third being angularly inclined to and interconnected between the first two surfaces. The faces coact in a manner wherein they lock in a first plane and can be disengaged or unlocked by moving one face away from the other in a second plane normal to the first plane. A detachable pin or key is employed which is disposed in aligned bores of the plates which when installed prevents the plates from being moved in the first plane.

The device is extremely simple in construction and effective in use. The normal and even abnormal stresses and impacts which a fastening device for concrete forms are subjected to will not dislodge or affect the holding characteristics thereof.

It is therefore an object of this invention to provide a fastening device for use with concrete forms or the like which will remain effective under normal and abnormal stresses and impacts.

Another object of this invention is the provision of a fastening device which is mountable on concrete forms or the like, which permits assembly and disassembly of the form and which will not become dislodged under vibration or rough use.

A further object of this invention is to provide a fastening device which does not require special tools or skill to lock and unlock.

Yet another object of this invention is the provision of a fastening device which is economical to manufacture, extremely compact, functional in use and simple but rugged in construction.

Yet a further object of this invention is the provision of a fastening device which is not only adaptable for temporarily securing two members together but which can also be used for a permanent fastener.

These objects, and other features and advantages of this invention will become readily apparent upon reference to the accompanying description, when taken in conjunction with the drawings.

BRIEF DESCRIPTION OF THE DRAWINGS

In the drawings, although various modifications and alternate constructions can be made thereto without departing from the true spirit and scope of the invention, a preferred embodiment of this invention is illustrated wherein.

DESCRIPTION OF THE PREFERRED EMBODIMENT

Figure 1:
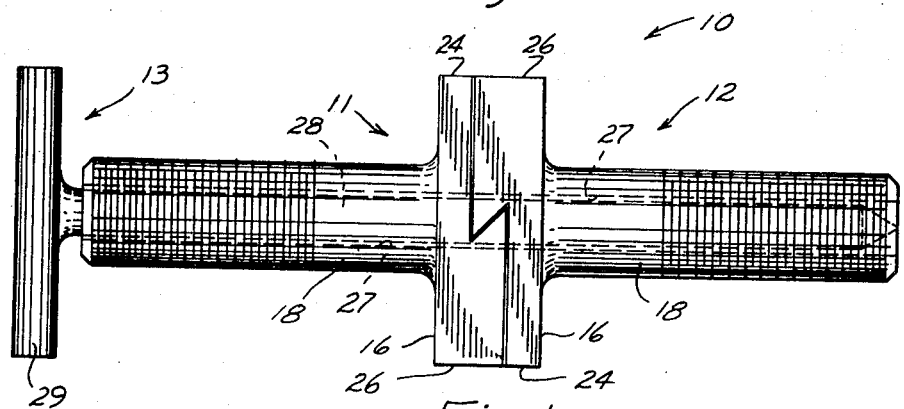
FIG. 1 is a side elevational view of this invention in a locked condition.
Figure 3:
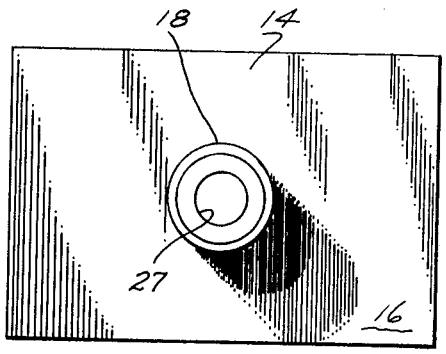
FIG. 3 is an end view of one of the sections.

Referring now to the drawings, the fastening device of this invention is indicated generally at 10 in FIG. 1, and is used in securing or joining two members (not shown) together. The device 10 comprises a first section 11 and a second section 12 which are mateable and held together by a pin 13 or the like. As the sections 11 and 12 are identical in form, only one of the sections will be described with like reference numerals referring to like parts.

Figure 2:
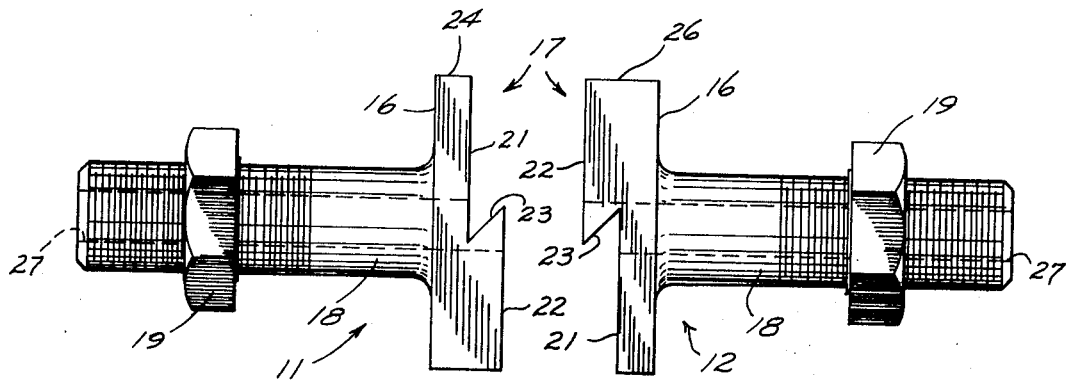
FIG. 2 is a side elevational view of part of the structure of FIG. 1 in an unlocked condition.

The first section 11 comprises a rectangular shaped block 14 having a rear face 16 and a front face 17. The rear face 16 can either be welded to a member or secured to a member by a bolt and a nut. In the latter instance, one end of a shank 18 is secured to the rear face 16, or is integrally formed therewith, and projects rearwardly thereof. The other end of the shank 18 is threaded for rotatably receiving a nut 19 (FIG. 2). In the event the shank 18 is used, the member (not shown) would have a hole drilled therein for receiving the shank and the nut would securely fasten the block to the member in a conventional manner.

Figure 4:
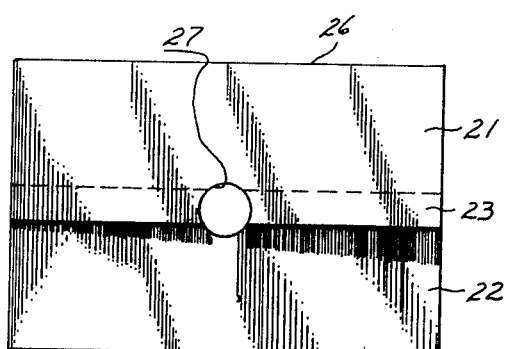
FIG. 4 is the opposite end view of the section of FIG. 3.
Figure 5:
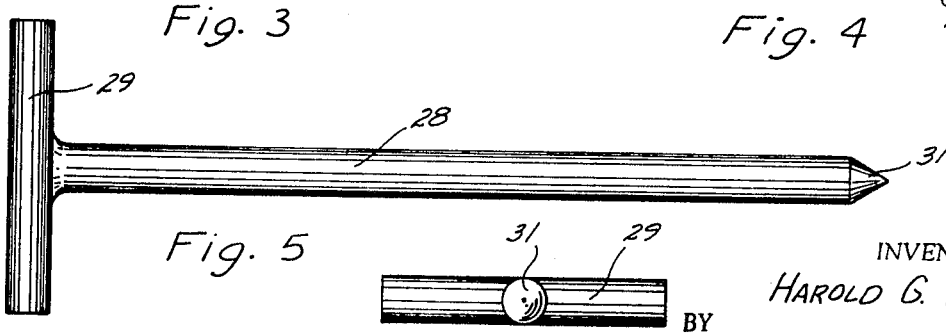
FIG. 5 is a side elevational view of the locking pin of this invention.
Figure 6:
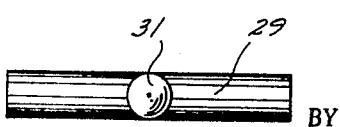
FIG. 6 is an end view of the pin of FIG. 5.

The front face 17 (FIGS. 2 and 4) has a first surface 21 offset from and parallelly disposed to a second surface 22, with the two surfaces interconnected by a third surface 23 which is angularly inclined at approximately 45 degrees to the first two surfaces. Each of the surfaces 21, 22 and 23 extend longitudinally across the face of the block, with the first surface extending laterally from the top edge 24 of the block past the lateral centerline thereof and the second surface extending laterally from the bottom edge 26 of the block past the lateral centerline thereof. Thus the two surfaces partially overlap at the center of the front face. Formed longitudinally through the shank 18 is a hole which extends through all three surfaces of the block 17.

With the top edge 24 of the block 12 inverted, it will be noted in FIG. 1 that the front faces 17 of the blocks are complementary and thus mateable, and the holes 27 are in axial alignment. To retain the blocks in a mated condition, the pin 13 having a shaft diameter smaller than the diameter of the hole 27 is slidably disposed in the holes 27. Secured normally to the head end of the shaft 28 of the pin 13 is a head 29, thus a graspable means is provided for inserting and removing the pin from the holes. The tail end 31 of the shaft is beveled to assist the insertion of the pin in the holes in the event they are not in alignment.

In the event the sections are disposed with the first section 11 depending from the second section 12 and the pin cannot be inserted from the second section to the first section, the inner surface of the shank 18 can be threaded and the tail end of the shaft 28 threaded, thus allowing the pin to be rotatably secured in the shank.

In use, each section is secured to an adjoining portion of adjoined members wherein the bores are in alignment and the pin is insertable therein. To secure a pair of members together having the sections mounted thereon, the first section is moved toward the section section, from a direction wherein the bottom edge 26 of one is directly above and slightly offset from the top edge 24 of the other, in a plane normal to the longitudinal axis of the sections, thus disposing the front faces of the two sections in juxtaposition and in frictional contact with each other. The members can be separated only by moving the sections apart in a direction opposite to that described hereinabove. Once joined together, the sections can be locked by inserting the pin through the bores.

If opposing longitudinal forces come into play, the third surfaces 23 in contact with each other, will prevent separation of the sections. If lateral forces occur, either the surfaces will tend to lock tighter or the pin will prevent dislodgement of the sections relative to each other. Twisting forces or one twisting force and a longitudinal force will be counteracted by the surfaces coacting with each other. Thus it can be seen, under any forces which may come into play, that the two sections can not be separated until the pin is removed and then only by moving one of the sections laterally relative to the longitudinal axis of the other. Furthermore, the pin will not be deformed while inserted in the bores, thus it can easily be removed when it is desired to separate the two members.

I claim:

1. A fastening device for securing two members together, the device comprising:

a first section including means adapted to be secured to one of the members, said first section having an outwardly projecting front face having a pair of parallel, partially overlapping surfaces interconnected at the overlapping ends by a third angularly inclined surface;

a second section including means adapted to be secured to the other of the members, said second section having a front face which is complementary in shape to said first section front face and thus mateable therewith, wherein said faces can be disposed in juxtaposition and thus secured together by moving the first member toward the second member from only one direction in a plane in which the longitudinal axis of said first section is normal to the longitudinal axis of said second section, and said faces can be separated by moving the second member away from said first member in a direction opposite to said one direction in said plane;

Said first section has a centrally disposed bore formed entirely therethrough normal to said parallel surfaces and in alignment with a similar bore formed through said second section, and including an elongated pin of a length greater than that of the bore in said first section so as to extend at least part way into the bore in said second section, said pin adapted to be detachably disposed in said bores for preventing separation of said faces; and means secured to one end of said pin to allow insertion of or removal of said pin from said bores.

2. A fastening device as defined in claim 1 wherein said first section means comprises a shank secured at one end thereof to the rear face of said first section and projecting outwardly therefrom, said shank other end adapted to be detachably secured to one of the members.

3. A fastening device as defined in claim 2 wherein said second section means comprises a second shank secured at one end thereof to the rear face of the said said second section and adapted to be detachably secured at the other end thereof to the other of the members.

4. A fastening device as defined in claim 3 wherein the other ends of said shanks are threaded to rotatably receive a nut.

* * * * *